Patented May 13, 1952

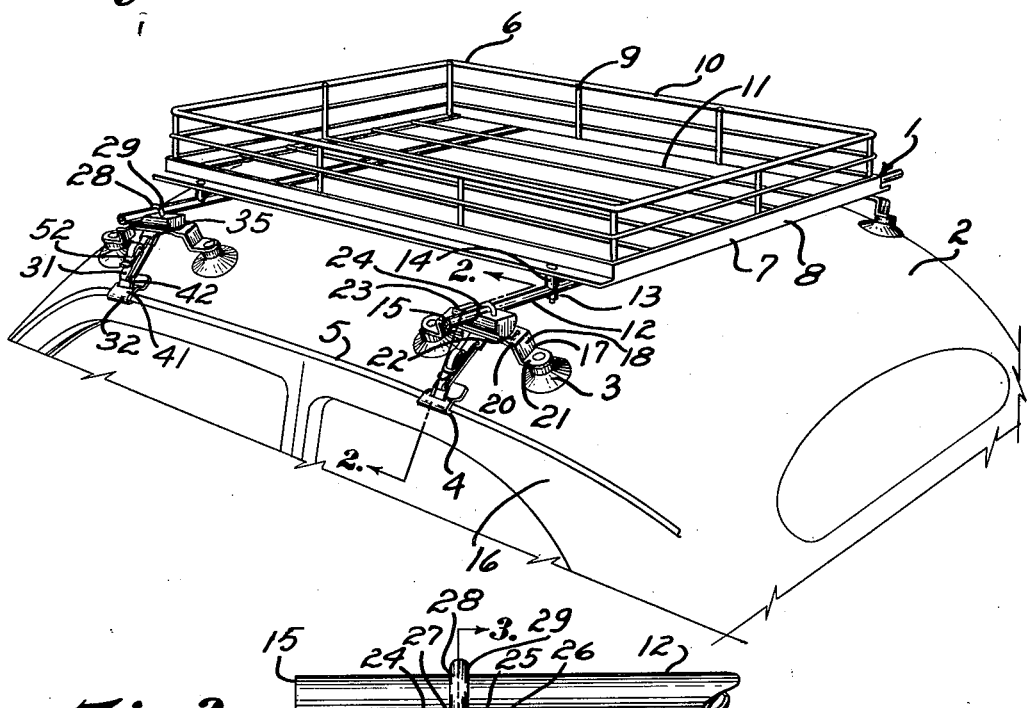

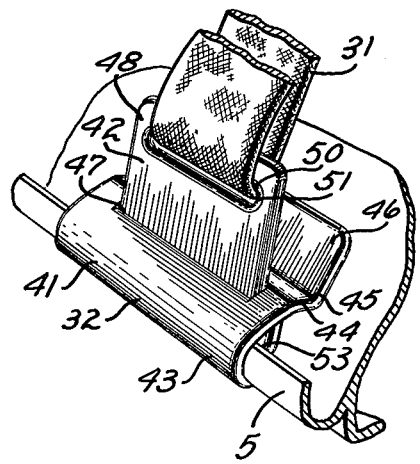
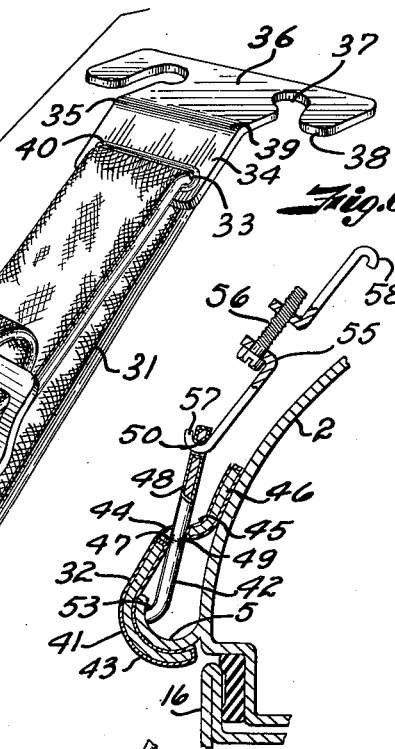
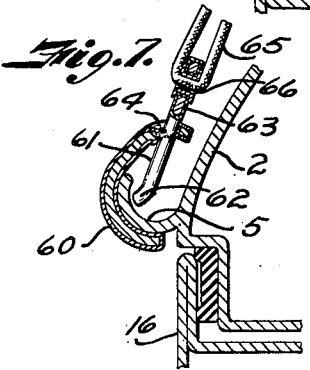

2,596,860

UNITED STATES PATENT OFFICE 2,596,860

LUGGAGE CARRIER ATTACHMENT FOR AUTOMOBILES

Kenneth W. McCrory and Albert W. Rollins, Kansas City, Mo., assignors to Parker-McCrory Manufacturing Company, Kansas City, Mo., a corporation of Missouri Application February 3, 1950, Serial No. 142,224

6 Claims. (Cl. 224—42.1)

This invention relates to automobile luggage carrier mountings and keepers therefor, and more particularly to mountings and fasteners for securing luggage and/or like carriers on roofs or tops of automobiles.

The objects of the present invention are to provide a luggage carrier mounting and keepers therefor adapted for releasable engagement on curved or sloping surfaces and the side drainage gutters which normally are part of automobile body construction; to provide the luggage carrier with universally mounted vacuum cups which permit said cups to substantially align with the radius of the contour and adhere to the surface with substantially equal pressure on the entire surface engaging edges of said cups; to provide a vacuum cup mounting on luggage carriers whereby said cups may engage and adhere to the curved portions at the sides of the top where same has greater rigidity; to provide fastening devices in combination with the vacuum cup mountings for preventing shifting of the load on said mountings; to provide the luggage carrier mounting with hooks which substantially conform to the outer surface of the drainage gutters and have jaws or keepers in connection therewith for eliminating possibility of accidental release of said hooks or movement thereof longitudinally of the gutters; to provide a luggage carrier mounting with hooks and clamps or keepers therefor having an automatic closing or gripping action whereby said hook cannot be dislodged by striking same with the door of an automobile or by slight loosening of the connection with the luggage mounting thereby eliminating any possibility of accidental dislodgment of the luggage from the top of the automobile; to provide an automobile luggage carrier mounting so constructed as to be securely mounted on an automobile top without marring any portions of the automobile structure; and to provide a luggage carrier mounting and clamps or keepers therefor which is economical to manufacture, of strong durable structure, that is easily attached and removed from automobiles yet when attached is positively retained thereon and substantially eliminates possibility of accidental dislodgment or shifting, this mounting being adapted to engage the side portions of the automobile top whereby said mounting will not dent or otherwise damage the automobile structure.

In accomplishing these and other objects of the invention, we have provided improved details of structure, the preferred forms of which are shown in the accompanying drawings wherein:

Fig. 1 is a fragmentary perspective view showing a luggage carrier secured in place by mountings and hooks having keepers embodying the features of the present invention.

Fig. 2 is a sectional view showing the mountings and keepers and engagement thereof with the automobile body on the line 2—2 of Fig. 1.

Fig. 3 is a sectional view through the mounting on the line 3—3, Fig. 2.

Fig. 4 is a perspective view of the hook and keepers as applied to the drainage gutter of an automobile.

Fig. 5 is a disassembled perspective view of the hook, keepers and connection thereof with the luggage mounting.

Fig. 6 is a sectional view of the hook and keeper with a rigid luggage connector.

Fig. 7 is a sectional view showing a modified form of clamping hook.

Referring more in detail to the drawings:

1 designates a luggage carrier adapted to be supported on the top 2 of an ordinary automobile body by a plurality of resilient members such as rubber suction or vacuum cups 3 and secured by fastening devices 4 to the drainage gutters 5 at the sides of the top 2. The luggage carrier preferably comprises a receptacle 6 of any suitable construction. In the illustrated structure, the receptacle consists of the rectangular frame 7 formed of angle-irons 8, upright members 9 and a plurality of rods 10 all suitably secured together as by welding to form sides and ends of the receptacle. Rods 11 are suitably secured as by welding to the angle-iron frame 7 to form the bottom of the receptacle.

Transverse members 12 having cylindrical portions are arranged adjacent the respective ends of the receptacle and are secured thereto by fastening devices 13 such as bolts and nuts. The transverse members 12 are tubular for lightness in weight and are spaced from the bottom of the receptacle by spacers 14. The members 12 extend laterally of and beyond the sides of the receptacle and preferably terminate as at 15, short of the sides 16 of the automobile to avoid having any projecting portions.

Supports 17 are arranged to carry each end of the transverse members 12 and have universal connection therewith. The supports 17 each consist of spaced legs 18 and 19 connected at their upper ends by bridge pieces 20 which may be integral therewith. The legs 18 and 19 are preferably of equal length and have feet 21 extending outwardly at their lower ends. The vacuum cups 3 are suitably secured to each of the feet and are preferably formed of highly flexible yieldable rubber so that when the concave bottom surfaces are pressed firmly against the top surface of an automobile a vacuum will be created to effect adherence thereto. The supports 17 are adapted to be arranged whereby the bridge pieces 20 extend longitudinally of the automobile body with the transverse members 12 extending over and across the central portion of said bridge members. Each of the bridge members is preferably formed to provide a longitudinally arranged cylindrical concavity 22 in the upper face thereof, the radius of said concavity substantially conforming to the radius of the outer surfaces of a semicylindrical member 23 adapted to seat in the concavities 22. The upper surfaces of the semicylindrical members 23 are provided with a cylindrical concavity 24 or seat adapted to receive the cylindrical portion of the transverse members 12 as illustrated in Fig. 2.

The semi-cylindrical members 23 are provided with spaced apertures 25 registrable with transverse slots 26 in the bridge pieces 20, the spacing of the apertures 25 and slots 26 being slightly greater than the diameter of the cylindrical portions of the transverse members 12 whereby legs 27 of U-bolts 28 may be inserted therethrough. The legs 27 of the U-bolts are connected by arcuate portions 29 which extend over and engage the transverse members 12, the free ends of said legs 27 being threaded and having nuts 30 screwed thereon. Through this arrangement, the transverse members 12 may turn or rock in the concavity 24 about the axes thereof which are transverse to the automobile and the semicylindrical members 23 may rock in the concavities 22 to effect a movement about the longitudinal axis relative to the automobile to provide a universal connection between the transverse members 12 and the supports 17. The only limit as to the extent of this universal movement being the length of the slots 26, however, when the nuts 30 are tight the U-bolts 28 are pulled against the transverse members 12 to secure same to the semi-cylindrical members 23 and the members 23 to the bridge members 20 to form a rigid connection.

The luggage carrier is adjustably secured to the automobile body by means of connecting members or straps 31 having hook and keeper devices 32 thereon adapted to engage the drainage gutter 5 of the automobile body. The straps 31 preferably extend through eyes 33 in flanges 34 of suitable brackets 35 removably connected to the U-bolts 28. In the form of bracket illustrated, the bar portions 36 of said brackets are provided with notches 37 opening on the sides 38 adjacent the flanges 34 and arranged at an angle thereto whereby one of the said notches 37 of each bracket may be engaged with a leg 27 of the respective U-bolt 28 and the bracket turned about said leg to engage the other notch with the other leg of said U-bolt, however, said notches are so arranged that a straight pull toward either side of the bar member will not disengage the notches 37 from the legs of the U-bolt. The bar portions preferably are arranged between the nuts 30 and the bridge pieces 20 of the supports 17 whereby tightening of the nuts 30 will rigidly secure the brackets to the support members. The flanges 34 extend from the sides 38 of the bar members and are provided with bends 39, whereby when the supports 17 for the carrier and the universal connections thereof with the transverse members 12 are in normal position on an automobile top, the flanges 34 will extend approximately on lines with the straps 31. It is preferable that the eyes 33 in the flanges 34 each be provided with a grommet 40 of suitable material to reduce the abrasion and damage that might occur to the strap by relative movement of the strap and bracket during use.

The hook and keeper devices 32 are preferably formed of sheet metal and each consists of a hook member 41 and a jaw or keeper member 42. The hook member 41 is so shaped as to provide a curved hook portion 43 formed at one end thereof and extending across for the full width of the hook member. The inner radius of said hook portion conforms substantially to the radius of the outer surface of the drainage gutter 5 to provide maximum friction against slipping of the hooks laterally towards the front or rear along the gutters. The hook member is preferably provided with intermediate spaced opposite bends 44 and 45 to form an abutment portion 46 adapted to engage the surface of the top of the automobile in spaced relation to the drainage gutters as illustrated in Fig. 2. A slot 47 is arranged between the hook and bend 44, through which a tongue 48 of the keeper 42 extends, said tongue having substantially the same width as the length of the slot and the jaw being substantially coextensive with the width of the hook member to form shoulders 49 adapted to engage the hook member at the ends of the slot 47 whereby the keeper member may fulcrum on the hook member. The tongue 48 is provided with a grommet 51 of suitable material to reduce abrasive action on the strap 31 which extends through the eye 50. All of the surfaces of the hook member 41 and jaw member 42 are preferably covered with a suitable cushioning material such as felt, rubber and the like to prevent marring the finish on the automobile.

The straps 31 extend through the eyes 40 and the eyes 50 and are provided with buckles 52 for suitably securing the ends of the straps whereby said straps may be adjusted in length forming a tight connection between the hook and keeper devices 32 and the luggage carrier supports 17. Tension on the straps 31 fulcrums the keeper members at the ends of the slots 47 whereby the curved lower edges 53 of the jaw approaches and/or engages the inner upper surface of the drainage gutters and the hook members engage the outer surfaces of said gutters to retain the hooks in engagement with the gutters. The gutters may be clamped or gripped between the hooks and keepers, however, the keepers will prevent the hooks from being dislodged or removed if the edges 53 are only near the inner upper surface of the gutters. Also a very slight clamping action may be used satisfactorily. Also with this hook and keeper arrangement, the strap 31 can be very loose without the hook being disengaged from the gutter as there must be considerable movement on the outer portion of the keeper before there is spacing between the hook portion and the jaw sufficient to disengage the hook from the gutter. In instances where the upper edge of the automobile door is positioned very close to the bottom of the gutter, opening of the car door will knock conventional hooks from engagement with the gutter. The keeping action of the present jaw and hook portions on the gutter prevent any accidental disengagement or dislodgment of the clamping hook from said gutter by the door or other means.

In using a luggage carrier constructed and assembled as described, the carrier is placed on a top of an automobile with the transverse members 12 extending transversely on said automobile, the carrier preferably being arranged substantially centrally of the top with the vacuum cups 3 engaging said top. The nuts 30 are then loosened whereby the supports 17 may be moved along the transverse members 12 to position said supports on the curved portion of the top adjacent the sides thereof, as that curved portion is more rigid and can support greater weight than the central flatter portion of the top. The supports each pivot about the axis of the transverse member 12 and the axis of the curvature of the bridge 20 whereby the vacuum cups have substantial uniform engagement with the surface of the automobile top. The nuts 30 are then tightened to form a rigid structure with each of the vacuum cups engaging the supporting surface with no tilting of the vacuum cups relative to the surface engaged thereby. Each of the straps 31 are then loosened to permit pivoting of the keeper member at the ends of the slot 50 whereby the edge 53 of the jaw and hook portion 43 are pulled apart sufficiently to engage the hook portion under the drainage gutter and to arrange the jaw portion of the keeper adjacent the inner surface of said gutter. The straps 31 are then tightened to exert a pull on the upper end of the tongue 48 to draw the hook portions into tight arrangement with the gutter and hold the keeper in place to prevent dislodgment of said hook. The straps also apply force to the supports 17 to hold same securely on the automobile top and to eliminate any possibility of the luggage carrier slipping or moving on the top of the automobile or the luggage carrier from being dislodged from said automobile top. The locating of the vacuum cups 3 on the curved portion of the automobile top and the cushioning coating on the jaw and hook members reduce the possibility of marring the finish of the automobile. While it is desirable that the hook portion conform in shape to the gutter, said keeper and hook will function on any automobile gutter or the like at the sides of the top thereof due to the hook and jaw members being held on opposite sides of the gutter in response to tension on the strap 31, however, by suitably loosening the strap the hook and keeper devices may be easily disengaged for quick removal of the luggage carrier.

While the device is illustrated as having a receptacle 6, it is believed obvious that the transverse members 12 or the like be attached and supported by the supports 17 and clamping hook members to carry other types of receptacles or support other devices directly on the transverse members 12.

In the form of the invention illustrated in Fig. 6, the hook and keeper are substantially the same as illustrated in Fig. 2 and an adjustable substantially rigid connector 55 is substituted for the strap 31. The connector consists of two pieces adjustably secured together by a screw 56, one of said pieces having a hook 57 adapted to extend through the slot 50 for connecting the keeper thereto. The other piece is provided with a hook 58 or other suitable device for connecting with the luggage support.

In the form of the invention illustrated in Fig. 7, the clamping hook consists of a hook member 60 and keeper member 61. The keeper member has an end forming a jaw 62 and a tongue 63 extending through a slot 64 in the hook member whereby tension on a strap 65 extending through an eye 66 in the tongue 63 of the keeper member fulcrums the keeper member at the ends of the slot 64 to retain the gutter between the hook and jaw without an abutment contacting the top of the automobile. Other variations of the arrangements of the hook and keeper members may be provided wherein tension on the keeper member by the strap retains the hook in engagement with the gutter and said gutter between the hook and keeper.

It is believed obvious that we have provided a luggage carrier which is positively secured to the top of an automobile in an efficient manner to prevent damage to the automobile and prevent any possibility of accidentally dislodging the carrier or mounting therefor.

What we desire to claim and secure by Letters Patent is:

1. A luggage carrier for mounting on the top of an automobile comprising, a receptacle, transverse members secured to said receptacle, spaced supports over the automobile top in inwardly spaced relation to the longitudinal edges and having universal connections with the transverse members, resilient members on the supports for engaging the top of an automobile, means for releasably securing the supports and transverse members together to prevent a universal movement thereof, hook members having portions adapted to engage the outer surface of the usual open top gutters along the longitudinal edges of the automobile top, abutment portions on the hook members extending upwardly therefrom and engaging the automobile top above the gutters, said hook members having slots therein adjacent the abutment portions and above the open top of the gutters, a keeper member on each hook member and having portions adjacent the inner surface of the gutters, a tongue on each keeper member extending upwardly through the slot of a hook member and fulcrumed on the edges thereof, the upper portions of said tongue being spaced from the automobile top and means adjustably connecting the supports and upper portions of the tongues whereby tension on said connecting means draws the upper portions of the tongues toward the automobile top and moves the keeper members toward the inner surface of the gutters to substantially engage same and retain the gutters between the respective keeper and hook members and retains the resilient members in engagement with the automobile top.

2. A luggage carrier for mounting on the top of an automobile comprising a receptacle, transverse members secured to said receptacle adjacent the ends thereof, spaced supports over the automobile top in inwardly spaced relation to the longitudinal edges thereof and having universal connections with the transverse members, said supports each having spaced legs, vacuum cups fixed to the support legs, said universal connections permitting the supports to be moved relative to the transverse members to position of the vacuum cups on the usual curved portions adjacent to sides of the automobile top with the plane formed by the edges of the respective cups substantially perpendicular to the radii of curvature of said curved portions, means for releasably securing the support and transverse members together to prevent a universal movement thereof, hook members adapted to engage the outer surface of the usual open top gutters along the longitudinal edges of the automobile top, portions on the hook members extending upwardly and over the open top gutters and having slots therein above said gutters, a keeper member on each of the hook members and having portions adjacent the inner surface of the gutters, a tongue on each keeper member extending upwardly through the slot of a respective hook member, said tongue being spaced from the automobile top and means adjustably connecting the supports and portions of the tongues above the slots of the hook members, whereby tension on said means draws the tongues toward the automobile top and moves the keeper members toward the surface of the gutters to substantially engage same and retain the gutters between the respective keeper and hook members and retains the vacuum cups in engagement with the automobile top.

3. A luggage carrier for mounting on the top of an automobile comprising a receptacle, transverse members secured to said receptacle adjacent the ends thereof, said transverse members having cylindrical portions, a rocker member engaging the cylindrical portions of the transverse members and having cylindrical bottoms thereon extending substantially longitudinally of the receptacle, supports each having pairs of spaced legs, resilient members fixed on each of said spaced legs and adapted to engage the top of an automobile, a bridge connecting the spaced legs of each support, said bridge having arcuate seats therein for receiving the cylindrical bottoms of the rocker members said rocker members and bridges having aligning spaced apertures and slots respectively, means engaging the cylindrical portions of the transverse members and extending through the slots and apertures for releasably securing the supports and transverse members together to prevent universal movement thereof, a bracket engaging the fastening means on the respective supports and secured thereby to said supports, hook members adapted to clamp on the usual gutters along the longitudinal edges of the automobile top, and means adjustably connecting the hook members and brackets whereby tension on said connecting means retains said hook members secured to the gutters and retains the resilient members in engagement with the automobile top.

4. A luggage carrier for mounting on the top of an automobile comprising a receptacle, transverse members secured to said receptacle adjacent the ends thereof, said transverse members having cylindrical end portions, a rocker member engaging the cylindrical portions of the transverse members and having cylindrical bottoms thereon extending substantially longitudinally of the receptacle, supports each having pairs of spaced legs, resilient members fixed on each of said spaced legs and adapted to engage the top of an automobile, a bridge connecting the spaced legs of each support, said bridge having arcuate seats therein for receiving the cylindrical bottoms of the rocker members said rocker member and bridges having aligning spaced apertures and slots respectively, fastening means engaging the cylindrical portions of the transverse members and extending through the slots and apertures for releasably securing the supports and transverse members together to prevent universal movement thereof, a bracket having notches engaging the fastening means on the respective supports for securing said brackets thereto, hook members adapted to engage the outer surface of the usual gutters along the longitudinal edges of the automobile top, a keeper member on each of the hook members and having portions adjacent the inner surface of the gutters, and means adjustably connecting the keeper members and brackets whereby tension on said connecting means retains the gutters between the keeper and hook members and retains the resilient members in engagement with the automobile top.

5. In a luggage carrier having portions for engaging the top of an automobile in spaced relation to the usual open top gutters on the longitudinal edge of said top, hook members for engaging the outer and underneath surfaces of said usual gutters, portions on the hook members extending upwardly and over the open top of the gutters, keeper members for substantially engaging the inner surface of the gutters, upwardly extending portions on the keeper members fulcrumed on the upwardly extending portions of the hook members and extending thereabove in spaced relation to the automobile top, and means adjustably connecting the luggage carrier and keeper portion above the fulcruming point thereof whereby tension on said means draws the upwardly extending portions of the keeper toward the inner surface of the gutters to substantially engage same and retain the gutters between the respective keeper and hook members.

6. In a luggage carrier having luggage supports for engaging the top of an automobile in spaced relation to the usual open top gutters on the longitudinal edges of said top, hook members for engaging the outer and underneath surfaces of said usual gutters, abutment portions on the hook members and extending upwardly therefrom and engaging the automobile top above the gutters, said hook members having slots therein adjacent the abutments and above the open top of the gutters, keeper members for engaging the inner surface of the gutters, a tongue on each keeper member extending upwardly through the slot of a hook member and fulcrumed on the edges thereof, the upper portions of said tongues being spaced from the automobile top, and means adjustably connecting the luggage supports and tongues whereby tension on the said means draws the upper portions of the tongues toward the automobile top and moves the keeper members toward the inner surface of the gutters to substantially engage same and retain the gutters between the respective keeper and hook members.

KENNETH W. McCRORY.
ALBERT W. ROLLINS.

REFERENCES CITED

The following references are of record in the file of this patent:

UNITED STATES PATENTS

| Number | Name | Date |
| --- | --- | --- |
| 1,748,282 | Ellis | Feb. 25, 1930 |
| 1,894,083 | Chaney | Jan. 10, 1933 |
| 2,119,051 | Le Boeuf | May 31, 1938 |
| 2,461,897 | Hopkins | Feb. 15, 1949 |
| 2,469,987 | Pilsner | May 10, 1949 |
| 2,470,848 | Guest | May 24, 1949 |
| 2,514,266 | Walslager | July 4, 1950 |

FOREIGN PATENTS

| Number | Country | Date |
| --- | --- | --- |
| 776,636 | France | Nov. 8, 1934 |
| 857,788 | France | Apr. 29, 1949 |